March 17, 1931.     A. L. THOMPSON     1,796,672
POULTRY FOUNTAIN
Filed July 23, 1928
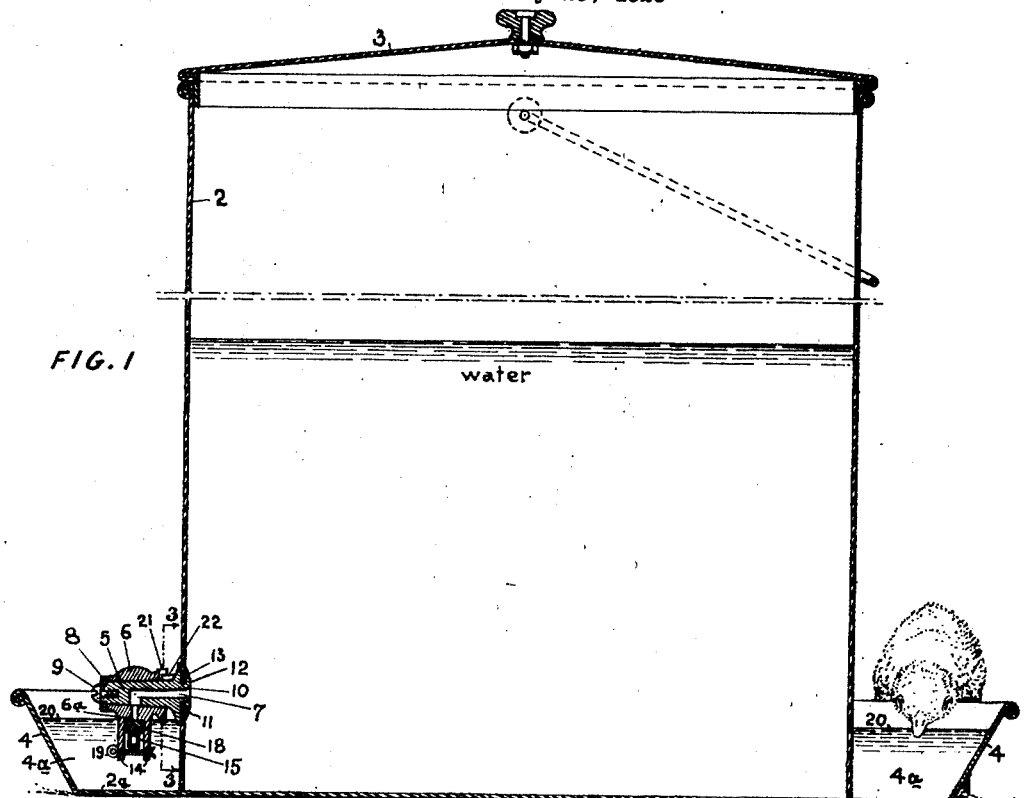
FIG.1
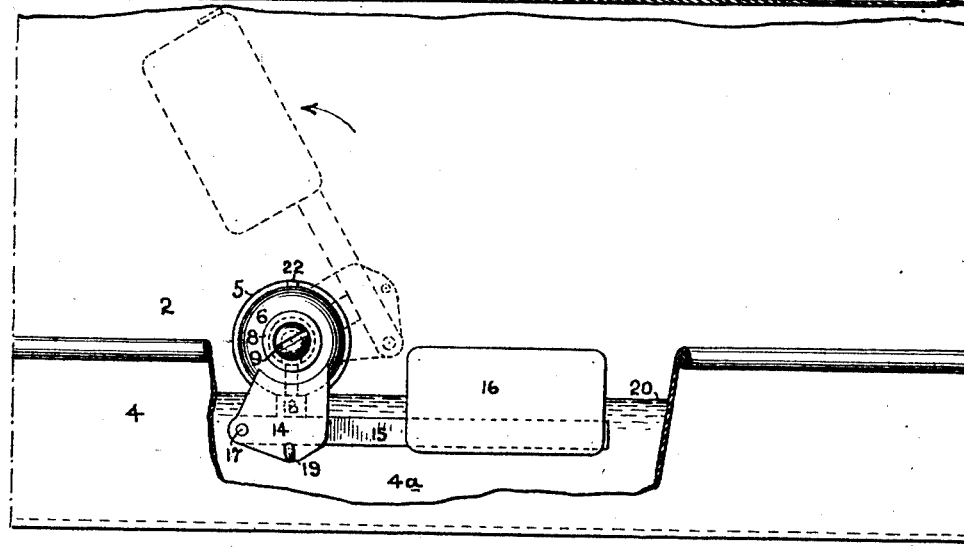
FIG.2
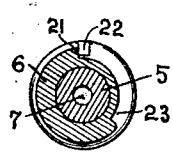
FIG.3
Inventor.
Alfred L. Thompson.
By 
Attorney.

Patented Mar. 17, 1931

1,796,672

UNITED STATES PATENT OFFICE

ALFRED L. THOMPSON, OF WOODBOURNE, PENNSYLVANIA

POULTRY FOUNTAIN

Application filed July 23, 1928. Serial No. 294,674.

The object of my invention is to provide an efficient construction of valve means for a chicken fountain which will permit the fountain to be readily cleansed so as to be sanitary and at the same time capable of being filled with water without the necessity of inverting the fountain or requiring a partial vacuum to be maintained for the automatic control of the water from the tank into the tray.

My object is also to provide a float control means for the valve to regulate the passage of water from the tank into the tray and insure a constant level being maintained therein.

My object is further to so construct the regulating float valve mechanism that it may be turned upward above the tray to enable ready cleansing of the same, and also to perform the function of a shut-off valve to prevent the escape of water from the tank into the tray during the act of cleaning it.

With these and other objects in view, my invention consists of certain improvements in valves for chicken fountains which are fully described hereinafter and more particularly pointed out in the claims.

My invention will be better understood by reference to the drawings, in which: Fig. 1 is a vertical section of a chicken fountain embodying a valve containing my improvements; Fig. 2 is a front elevation of a portion of the fountain and more particularly illustrating the float actuated shut-off valve; and Fig. 3 is a vertical section taken on line 3—3 of Fig. 1.

2 represents a water tank and may be of any size or height and open at the top. The open top may, if desired, be normally closed by a loosely fitting lid or cover 3 to keep out the dust and the dirt which may be disturbed by the wind in the neighborhood of the fountain. The bottom of the tank is extended as at 2a, and its outer edge turned upward as at 4 to form the circular water tray 4a. In practice, it is desirable that this tray 4a shall extend entirely around tank 2 so as to provide an extended exposure of water contained therein to permit a large number of chickens the opportunity of drinking at the same time. I, however, do not limit myself as to the shape or extent of the water tray portion 4a as it may be of any extent or shape desired.

At the lower part of the tank 2, preferably at or above the level of the tray rim 4, I provide a laterally extended tapered stud 5, the same having through it, a water passage 7. The inner end of this stud is provided with a tubular extension 10 which projects through an opening 11 in the wall of tank 2, and about which the said tubular extension 10 is flanged as at 12, thereby mechanically securing the stud strongly to the tank. To prevent the stud from turning and also to make a liquid tight mechanical connection between the stud and the tank, the union may be soldered as at 13. The base of the stud may be flanged as shown to make it more rigid and at the same time ornamental. It will be understood that the stud 5 may be attached to the tank in any other suitable manner and I therefore do not restrict myself in this respect.

Journaled upon the stud 5 is a valve hub or body 6, the same having a tapered hole through it which exactly fits the taper of the stud and the said hub is held snugly upon the stud by means of the washer 8 and clamping screw 9, which may be made very similar to what is employed in ordinary gas fixtures. The hub 6 is provided with a valve port 6a providing the seat for the valve piece 18, the same being preferably a disk or short cylinder of soft rubber. The port 6a is normally in alinement with the water passage 7 through the stud, so that the water may pass from tank 2 through the stud, and also through the port 6a into the tray 4a, when the rubber valve piece is permitted to be lowered to any appreciable extent.

The means for operating valve piece 18 comprises an arm 15 having a float 16 at one end and hinged at the other end upon a transverse pin 17 and so shaped that the arm presses upward upon the under side of the rubber valve piece to hold it tightly upon the port 6a whenever the water level 20 in the tray is of a height sufficient to raise the float 16 to the necessary extent to insure the proper application of pressure upon the rubber valve piece, such position being indicated in Fig. 2. As shown, the hub 6 is provided on its lower part with two downwardly extending walls 14 between which the float and arm 15 is pivoted and guided in its upward and downward movements; likewise these walls shield the rubber valve piece 18.

19 is a cotter pin which is extended transversely through the walls 14 under the arm 15 of the float so as to limit the downward movements of said arm, but at the same time permitting the pressure to be removed from the rubber valve piece in case the fountain is allowed to stand unfilled with water. This is desirable in view of the fact that the pressure should be removed from the rubber except when the fountain is in action or operation. Furthermore, the limiting of the downward adjustment of the float and arm 15 by the use of the cotter pin 19, gives no opportunity for the rubber valve piece 18 to become disengaged.

While I have found in practice that soft rubber is very desirable for use as the valve piece, I do not restrict myself thereto, as the valve piece may be made of any other substance as may be found desirable. The advantage of a soft rubber valve piece is due largely to the fact that it readily adapts itself to make a tight joint with the least possible pressure and also with the least necessity for a thoroughly cleansed seat surface, such as is necessary when the valve piece is of metal.

When the float valve mechanism is in position of adjustment as shown in Figs. 1 and 2, the shoulder 21 of the notched portion 23 and the hub 6 rests against the end 22 of the lug as shown in Fig. 3 and prevents the hub from further rotation upon the stud 5. In that position the float 16 and the operating arm for the valve are in proper adjustment for a normal operation of the valve as a means of supplying water from the tank 2 into the tray 4a.

When it is desired to clean the tray, it is only necessary to turn the hub 6 with its float and arm 15 upward about the stud so that the said parts are clear of the tray as indicated in dotted line in Fig. 2. In this position the parts may be maintained by the friction of the hub 6 upon the stud 5, while the tray is being washed out or cleaned. When this is accomplished, the hub 6 is rotated back to the position indicated in Fig. 2 in full lines and thereafter float 16 and its arm 15 will operate the valve piece 18 in a normal manner to maintain the level of the water in the tray constant, at, for example the level shown at 20.

It will be further understood that if the tank 2 is full of water and was not desired to operate as a fountain, for a period of time, the hub 6 may be turned to bring the parts to the position indicated in the dotted lines in Fig. 2, and thereupon the valve piece will be out of operation, the hub 6 acting as a valve member to shut-off the water passage 7 of the stud and prevent the flow of water into the tray.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details as the same are susceptible of modification in various particulars, without departing from the spirit or scope of the invention.

Having now described my invention, what I claim and desire to secure by Letters Patent is:—

1. A float controlled valve device consisting of a tubular stud connected at one end to a source of water supply and having an outlet opening, a water tray below the stud, a valve body rotatable upon the stud and having a port normally in alinement with the outlet opening of said stud, a valve piece for controlling the passage of water through the stud and valve body, and a float for actuating the valve piece hinged to the valve body and manually adjustable with said body into and out of the tray in a plane transversely to the axial length of the stud, said float normally controlled by the water in the tray.

2. The invention according to claim 1, wherein said valve body may be moved over the stud and held in its adjusted position by the weight of the float, the valve device being closed when said body is thus adjusted.

3. A float controlled valve device consisting of a tubular stud connected at one end to a source of water supply and having an outlet opening, a valve piece for controlling the flow of fluid through the tubular stud, a body part journaled upon the stud so as to be rotatable about a substantially horizontal axis and having a port normally in alinement with the outlet opening of said stud, a tray arranged below the stud, and a float hinged to the body part and actuated by the level of the fluid in the tray and connected to the valve piece for controlling the opening and closing of the opening in the body part and said float and body part adapted to be raised out of the tray to a position above the stud when it is desired to clean the tray.

4. The invention according to claim 3, wherein the valve piece is retained in a closed position by the float when the same is raised above the stud.

In testimony of which invention, I hereunto set my hand.

ALFRED L. THOMPSON.